United States Patent
Flachs et al.

(10) Patent No.: US 8,145,804 B2
(45) Date of Patent: Mar. 27, 2012

(54) SYSTEMS AND METHODS FOR TRANSFERRING DATA TO MAINTAIN PREFERRED SLOT POSITIONS IN A BI-ENDIAN PROCESSOR

(75) Inventors: Brian King Flachs, Georgetown, TX (US); Brad William Michael, Cedar Park, TX (US); Nicolas Maeding, Holzgerlingen (DE); Shigeaki Iwasa, Kanagawa-ken (JP); Seiji Maeda, Kanagawa-ken (JP); Hiroo Hayashi, Kanagawa-ken (JP)

(73) Assignees: Kabushiki Kaisha Toshiba, Tokyo (JP); International Business Machines Corporation, Armonk, NY (US)

( * ) Notice: Subject to any disclaimer, the term of this patent is extended or adjusted under 35 U.S.C. 154(b) by 255 days.

(21) Appl. No.: 12/563,756

(22) Filed: Sep. 21, 2009

(65) Prior Publication Data

US 2011/0072170 A1 Mar. 24, 2011

(51) Int. Cl.
*G06F 13/28* (2006.01)
(52) U.S. Cl. .......................... 710/22; 710/67
(58) Field of Classification Search .................. None
See application file for complete search history.

(56) References Cited

U.S. PATENT DOCUMENTS

| | | | |
|---|---|---|---|
| 5,781,763 A * | 7/1998 | Beukema et al. | 710/22 |
| 5,968,164 A | 10/1999 | Loen | |
| 6,122,667 A * | 9/2000 | Chung | 709/228 |
| 6,341,345 B1 | 1/2002 | Auslander | |
| 6,687,262 B1 | 2/2004 | Jin | |
| 6,799,232 B1 * | 9/2004 | Wang | 710/65 |
| 2005/0125647 A1 * | 6/2005 | Symes et al. | 712/300 |

OTHER PUBLICATIONS

Anonymous, "Endianness-Independent DMA Transfer Using a IXP400 Series Network Processor Engine," Jan. 21, 2004, IP.com, pp. 1-5.*

* cited by examiner

*Primary Examiner* — Eron J Sorrell
(74) *Attorney, Agent, or Firm* — Law Offices of Mark. L. Berrier (57) ABSTRACT

A bi-endian multiprocessor system having multiple processing elements, each of which includes a processor core, a local memory and a memory flow controller. The memory flow controller transfers data between the local memory and data sources external to the processing element. If the processing element and the data source implement data representations having the same endian-ness, each multi-word line of data is stored in the local memory in the same word order as in the data source. If the processing element and the data source implement data representations having different endian-ness, the words of each multi-word line of data are transposed when data is transferred between local memory and the data source. The processing element may incorporate circuitry to add doublewords, wherein the circuitry can alternately carry bits from a first word to a second word or vice versa, depending upon whether the words in lines of data are transposed.

19 Claims, 7 Drawing Sheets

SYSTEMS AND METHODS FOR TRANSFERRING DATA TO MAINTAIN PREFERRED SLOT POSITIONS IN A BI-ENDIAN PROCESSOR

BACKGROUND

1. Field of the Invention

The invention relates generally to computer systems and more particularly to systems and methods for enabling computer systems that implement data representations having a particular "endian-ness" to operate in conjunction with data sources that may have either the same endian-ness or different endian-ness.

2. Related Art

Modern computer systems provide ever-increasing capacity to process data. This capacity is expanded by making processors faster, smaller and more efficient. Often, computer systems will implement several processor cores to process data in parallel. The increased computing capability of these computers, however, is meaningless if the computers cannot properly communicate the data that is processed.

One of the issues that can cause problems in the communication of data is the manner in which data is represented. Computer systems typically represent data as a series of binary digits (1's and 0's). A byte (8 bits) of data can represent a decimal value from 0 to 255. For instance, the bit string "00000001" represents the decimal value "1".

In order for a computer system to properly interpret this bit string, however, it is necessary to know which bit is the first bit in the string, or if a data word contains multiple bytes, which byte is the first byte. Some computer systems store data beginning with the least significant byte (a "little-endian" data representation), while others store data beginning with the most significant byte (a "big-endian" data representation). If the same computer reads and writes the data, it will be properly interpreted, because only a single data representation is used. If different computer systems (or other devices) that use different data representations are used to write and read the data, however, care must be taken to ensure that the data is properly interpreted by both systems. If a data word is interpreted beginning with the wrong end of the word, the value of the data word will be misinterpreted.

Another issue that may cause problems in the communication of data between systems that use different data representations relates to the use of SIMD (single instruction, multiple data) instructions. SIMD-type instructions include multiple words that are interpreted as both control information and data. For instance, one system might use 128-bit lines of data (four 32-bit words) that can be interpreted as control information and three data words. In one instance, the line of data could be interpreted as a one-word shift value or address, with three words of data. In another alternative, the line of data could be interpreted as four words of data, one or more of which will be replaced by the result of a computation involving the four data words.

Typically, the word that contains the control scalar value (or shift amount, address, computation result, etc.) is identified by its position in a "preferred slot". A preferred slot is simply a designated position in which this type of data is stored. The location of the preferred slot may depend upon its size—for instance, in a 128-bit line of data, it may be a designated byte, halfword, 32-bit word, doubleword or quadword.

One difficulty that may arise in relation to preferred slots is that, in a processor that accommodates both big-endian and little-endian data sources, the positions of the preferred slots may change. The changing of the preferred slots' positions is typically handled by incorporating multiplexers into the design of the processor, so that the preferred slot data can be read from or written to the different positions that the preferred slots may occupy. These multiplexers add complexity to the design, increase the space required for the processor, increase the delay in accessing the preferred slot data and potentially limit the maximum operating speed of the processor. It would therefore be desirable to provide systems and methods for accommodating the changing preferred slot positions resulting from changing data representations without having to use these multiplexers.

SUMMARY OF THE INVENTION

One or more of the problems outlined above may be solved by the various embodiments of the invention. Broadly speaking, the invention includes systems and methods for accommodating changing preferred slot positions in a bi-endian processor system by transposing words within lines of data when the lines of data are transferred between the processor, which uses a first data representation, and a data source which uses a different data representation.

In one embodiment, a multiprocessor system includes multiple processing elements. Each processing element includes a processor core, a local memory dedicated for use by the processor core, and a memory flow controller configured to transfer data between the local memory and an external data source. The processing element may also include a local cache memory which is separate from the local memory. The memory flow controller of each processing element is configured to transfer multiple-word lines of data between the processing element and the data source in either of two modes. In a first mode that is used when the endian-ness of the processing element is the same as the data source, the memory flow controller transfers each line of data without transposing the words in each line of data. In a second mode that is used when the endian-ness of the processing element is different from the data source, the memory flow controller transposes the words in each line of data when the memory flow controller transfers the line of data. The processing element may also include logic circuitry that is configured to add doublewords in the lines of data. This logic circuitry carries bits from the first words of the doublewords to the second words of the doublewords, or from the second words to the first words, depending upon the endian-ness of the processing element and the data source.

Numerous additional embodiments are also possible.

BRIEF DESCRIPTION OF THE DRAWINGS

Other objects and advantages of the invention may become apparent upon reading the following detailed description and upon reference to the accompanying drawings.

While the invention is subject to various modifications and alternative forms, specific embodiments thereof are shown by way of example in the drawings and the accompanying detailed description. It should be understood that the drawings and detailed description are not intended to limit the invention to the particular embodiments which are described. This disclosure is instead intended to cover all modifications, equivalents and alternatives falling within the scope of the present invention as defined by the appended claims.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

Broadly speaking, the invention includes systems and methods for accommodating changing preferred slot positions in a bi-endian processor system by transposing words within lines of data when the lines of data are transferred between the processor, which uses a first data representation, and a data source which uses a different data representation.

Figure 1:
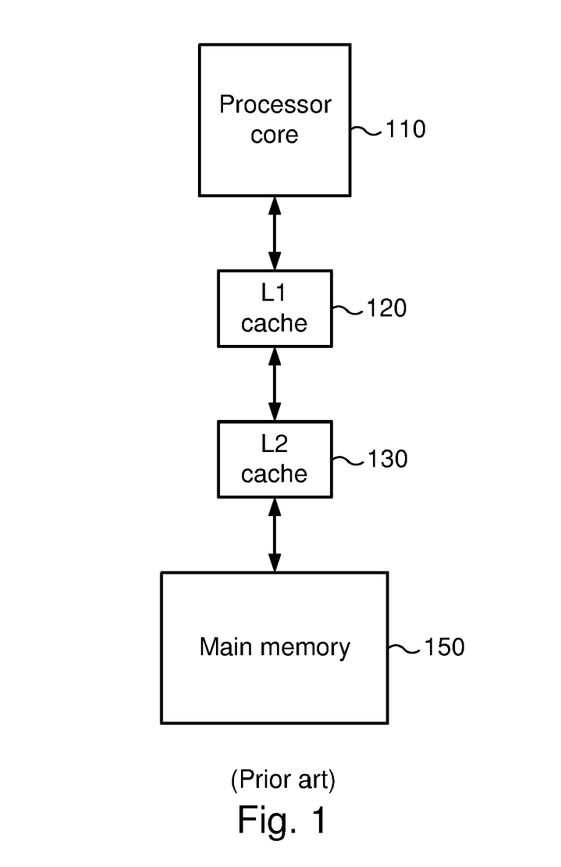
FIG. 1 is a functional block diagram illustrating the interconnection of a computer processor with cache memories and a main memory in accordance with the prior art.

Conventional computer systems typically employ a memory system that includes not only a main memory, but also one or more cache memories. A typical memory hierarchy is illustrated in FIG. 1. FIG. 1 is a functional block diagram that shows the interconnection of a computer processor with cache memories and a main memory. Processor 110 is coupled to a first cache memory 120, which is typically referred to as the level 1, or L1 cache. The L1 cache is, in turn, coupled to cache memory 130, which is referred to as the level 2, or L2 cache. L2 cache 130 is coupled to main memory 150.

Main memory 150 may be capable of storing up to four gigabytes of data, but it typically requires multiple processor cycles to perform each data access to the main memory. Cache memories 120 and 130 are provided in order to reduce the latency of these data accesses. Each of the cache memories is substantially smaller than the main memory, but they can be accessed more quickly (with lower data latency) than the main memory. Each successive cache memory is normally slightly larger than the preceding cache memory, and has a higher data latency than the preceding cache memory. Thus, for example, L1 cache 120 may only be capable of storing eight or sixteen kilobytes of data, but the data stored in this cache may be accessible in a single processor cycle. L2 cache 130 might then be configured to store half or four megabytes of data that can be accessed in two processor cycles. It should be noted that additional levels of cache memory can be implemented, with each successive memory having greater data capacity and greater data latency.

The conventional memory hierarchy of FIG. 1 is typically used because it provides both a wide memory address space and relatively fast access to the data stored in the memory. When processor 110 needs to access data, it forwards a data access request to L1 cache 120. If the data is currently stored in L1 cache 120, the data is returned by the L1 cache to the processor. If the desired data is not currently stored in L1 cache 120, the L1 cache forwards the data access request to L2 cache 130. If L2 cache 130 currently stores the data, the data is returned by the L2 cache to L1 cache 120, which then forwards the data to processor 110. L1 cache 120 also stores the data returned by L2 cache 130 so that it will be available in the L1 cache if processor 110 makes another access request for this data. If L2 cache 130 does not currently store the desired data, the L2 cache will forward the data access request to main memory 150. Main memory 150 will retrieve the requested data and return the data to L2 cache 130, which will store the data itself and forward the data to L1 cache 120. As noted above, L1 cache 120 will also store the data, and will forward the data to processor 110.

Some computer systems use other memory architectures to store data that is used by the systems' processor(s). For example, in the multiprocessor computer system illustrated in FIG. 2, each processor core is designed to access only data which is stored in a local memory associated with that core. As shown in the functional block diagram of FIG. 2, the system includes multiple processing elements (SPE's) 210-230, each of which is connected to a main memory 250 by an internal bus 260. In this system, each of the processing elements is designed to perform a relatively specialized function using instructions and data that can be stored in a relatively small amount of memory space.

Figure 2:
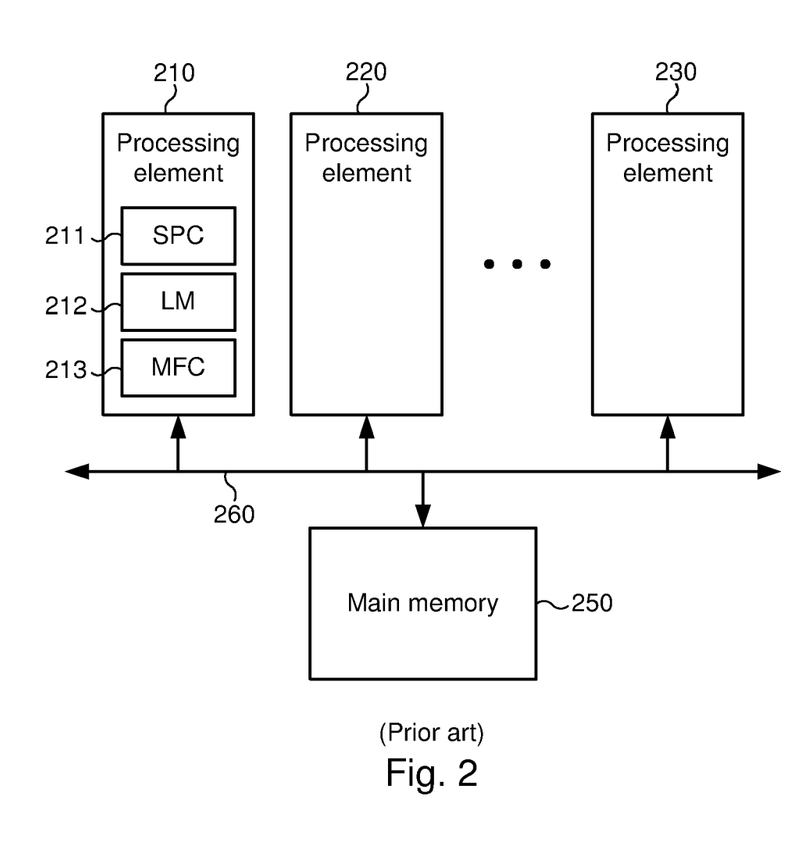
FIG. 2 is a functional block diagram illustrating a multiprocessor computer system in accordance with the prior art.

Each processing element includes a processor core (SPC), a local memory (LM) and a memory flow control unit (MFC). For example, processing element 210 includes processor core 211, local memory 212 and memory flow control unit 213. The memory flow control unit of each processing element functions as a direct memory access (DMA) engine which transfers data between the corresponding local memory (e.g., 212) and main memory 250. Because each processing element performs a relatively specialized function, the instructions and data necessary to perform a function can typically reside within the local memory of the processing element, which may have a data capacity on the order of 256 kilobytes. The memory flow control unit for the processing element therefore retrieves the necessary instructions and data from main memory 250 and then loads these instructions and data into the local memory for execution and processing by the processor core. If new instructions and/or data are needed by the processor core, the memory flow control unit will transfer unneeded data from the local memory back to main memory 250 if necessary, and will load new instructions and/or data from the main memory into the local memory. These data transfers may be performed in parallel with the execution of other instructions and/or processing and other data by the processor core.

A multiprocessor computer system of the type illustrated in FIG. 2 can provide a great deal of processing power because multiple processor cores are used. It may be more difficult, however, to take advantage of this processing power than to make use of a conventional single-processor system because of the limited amount of local memory space that is available for storing instructions and data that are used by the individual processing elements in the multiprocessor system. While a novice programmer can, with relative ease, produce a program that is efficiently executed by a single-processor computer system supported by a conventional memory hierarchy, it typically requires much greater proficiency to be able to produce a program that is executable within the constraints of the limited local memory of the multiprocessor system. The increased skill level that is required to program a multiprocessor system such as the one illustrated in FIG. 2 may limit the utility of such a system. It would therefore be desirable to provide a computer system that has the increased computational power of the multiprocessor system and the ease-of-programming of the conventional single-processor system.

Figure 3:
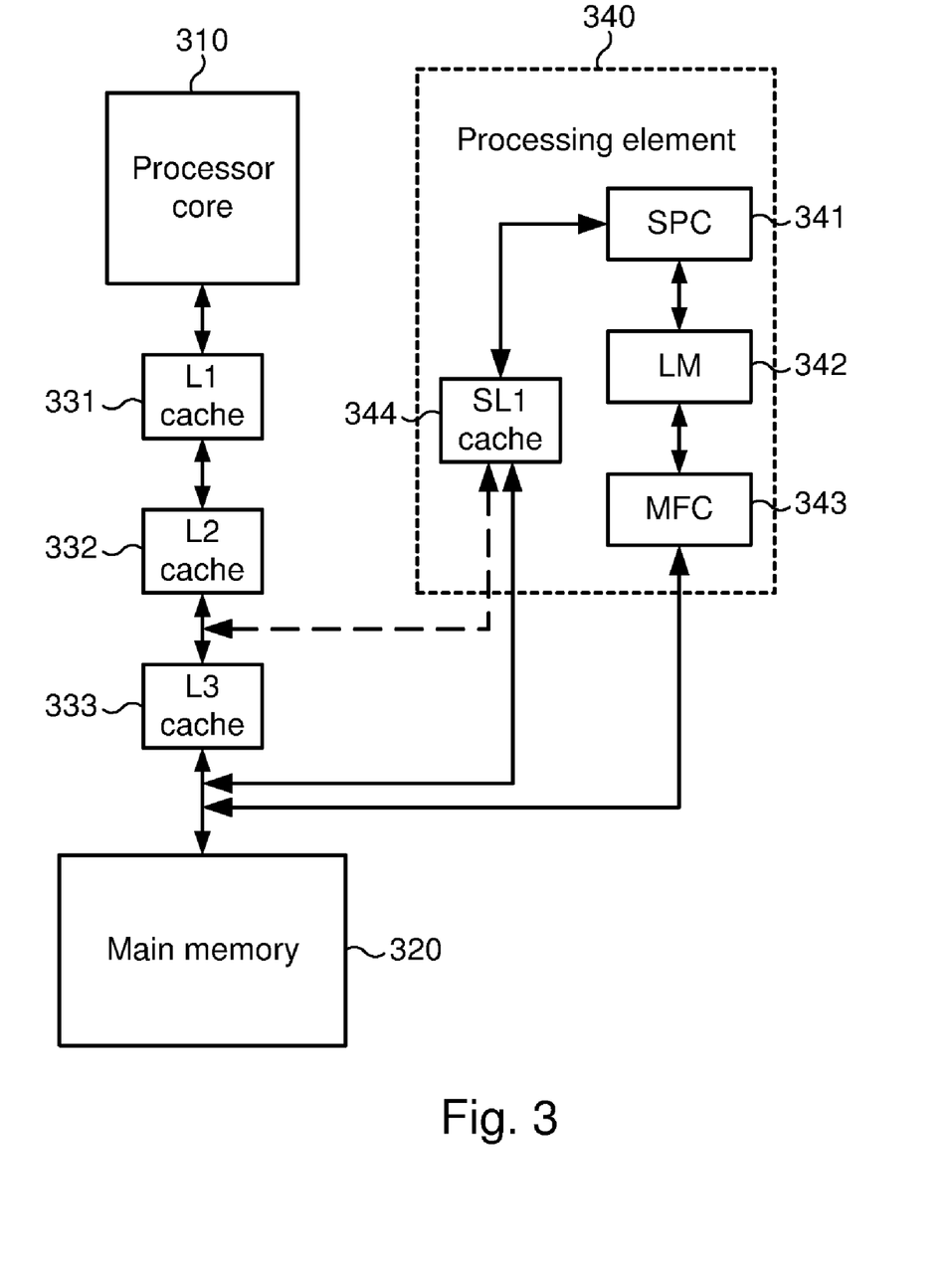
FIG. 3 is a block diagram illustrating the structure of a multiprocessor system that includes both a primary processor core that is linked to the main memory using a conventional memory hierarchy, and multiple processing elements that include local memories and cache memories that are linked to the main memory in accordance with one embodiment.

In order to provide these benefits, one multiprocessor system incorporates a cache memory into each processing element to provide a link between the processor core of the processing element and the main memory. This is illustrated in FIG. 3. FIG. 3 is a block diagram illustrating the structure of a multiprocessor system that includes both a primary processor core that is linked to the main memory using a conventional memory hierarchy, and multiple processing elements that include local memories and cache memories that are linked to the main memory.

In this embodiment, primary processor core 310 is linked to main memory 320 through three levels of cache memories, 331-333 (L1-L3, respectively). Primary processor core 310 accesses data through this conventional memory hierarchy, first accessing L1 cache 331, then L2 cache 332, then L3 cache 333, and finally main memory 320. Processing element 340 is one of a plurality of processing elements in the multiprocessor system. The remaining processing elements are not shown in this figure for purposes of clarity, but these processing elements have structures which are identical to the structure of processing element 340.

Processing element 340 includes a processor core 341, a local memory 342 and a memory flow controller 343 that are essentially as described above in connection with FIG. 2. Processing element 340, however, can access not only data that is stored in local memory 342, but also the data that is stored in a local cache 344 (the SL1 cache) and main memory 320. Thus, while processor core 341 can rapidly access the data stored in local memory 342, it is not limited to accessing this data, which must be loaded by memory flow controller 343 from main memory 320. Processor core 341 can also access the entire memory space that is available to primary processor 310 by forwarding a request for this data to SL1 cache 344.

SL1 cache 344 is coupled to main memory 320 to form a memory hierarchy similar to the one used by primary processor 310, except that the memory hierarchy coupled to processor core 341 has a single level of cache memory, rather than the three levels formed by cache memories 331-333. It should be noted that, in an alternative embodiment, SL1 cache 344 can be coupled to the caches of the primary processor (e.g., to L3 cache (333) as indicated by the dashed line), rather than being directly coupled to main memory 320. In this case, processor core 341 would access main memory 320 through SL1 cache 344 and L3 cache 333. SL1 cache 344 is, in this embodiment, a small cache, storing only 8-32 kilobytes of data. SL1 cache 344 is, however, configured to use the full (e.g., 64-bit) addressing employed by primary processor 310, so that processor core 341 can access all available data in main memory 320.

Figure 4:
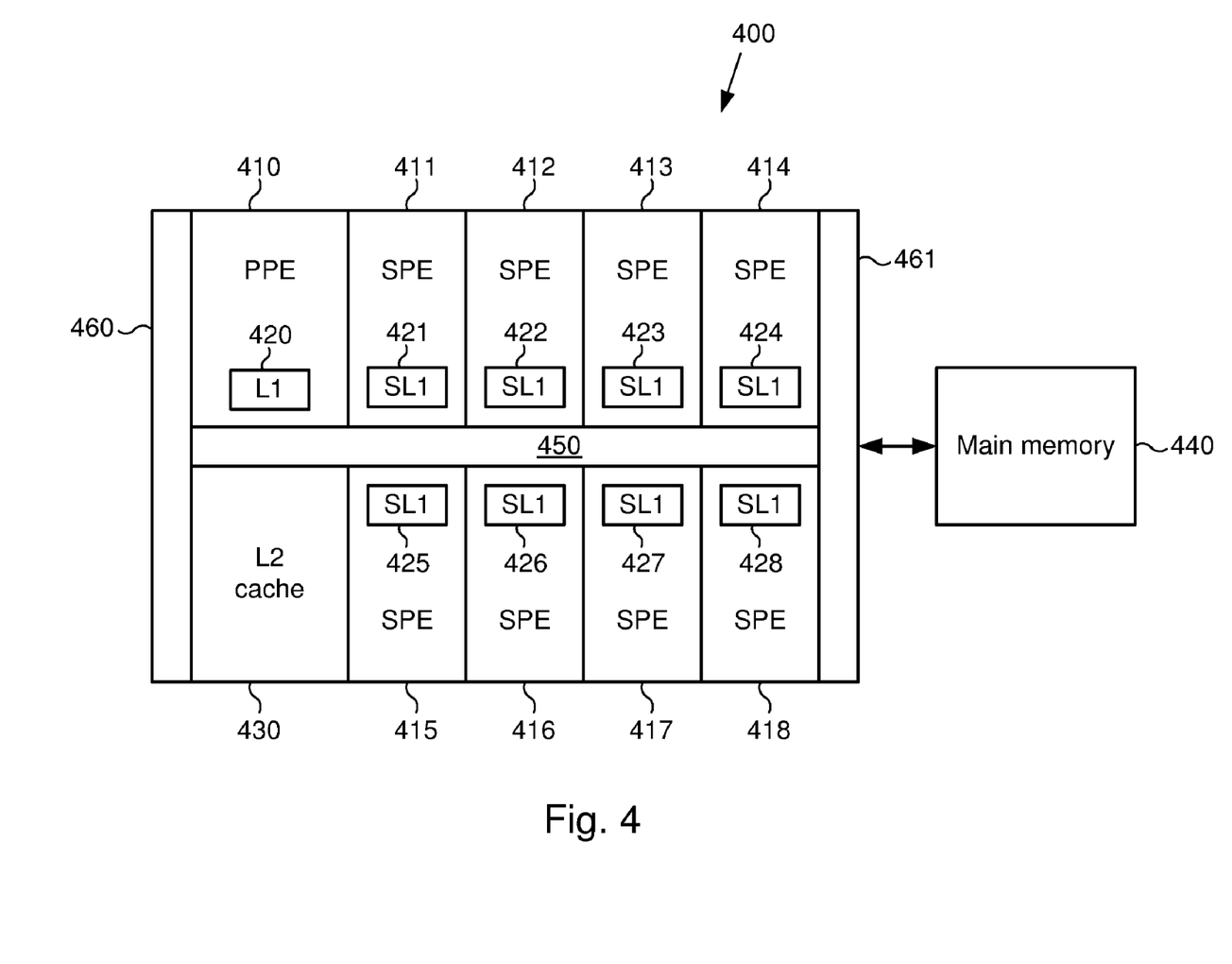
FIG. 4 is a block diagram illustrating the structure of a multiprocessor system that includes both a primary processor core and eight processing elements in accordance with one embodiment.

The LS1 cache illustrated in FIG. 3 can be implemented in a variety of multiprocessor systems. For example, the Cell processor jointly developed by Toshiba, Sony and IBM has eight processing elements into which the LS1 cache can be incorporated. Referring to FIG. 4, a Cell-type multiprocessor system 400 includes a primary processing element 410, and eight specialized processing elements 411-418. Each of processing elements 410-418 is coupled to an internal bus 450 which allows the processing elements to communicate with each other and with other components of the system. Input/output (I/O) interfaces 460 and 461 are coupled to internal bus 450 to allow the processing elements to communicate with other components of the system that are external to the die on which the processing elements are constructed. Primary processing element 410 includes a first-level cache 420, which is coupled to a second-level cache 430, which is in turn coupled to a main memory 440. Each of specialized processing elements 411-418 includes its own local cache (421-428, respectively) which functions in the same manner as the SL1 cache 344 of FIG. 3. Local caches 421-428 couple the respective specialized processing elements to main memory 440.

The systems illustrated in FIGS. 3 and 4 can enable even a novice programmer to write applications for execution by a multiprocessor system. Rather than being confined to the amount of space in the local memory, the programmer can access any available data in the main memory through the SL1 cache. The availability of data through the SL1 cache may also relieve the programmer of the need to program data transfers to and from the local memory using the memory flow controller.

By enabling access to a wider memory space, the addition of the local (SL1) cache facilitates the programming of the specialized processing elements in the Cell-type processor, and thereby makes this multiprocessor system available for use by programmers having a much wider range of skills. In particular, this allows novice programmers greater freedom in programming the specialized programming elements. The greater ease of programming the specialized processing elements opens this type of processor to a greater range of applications and makes available the increased number of processing threads that can be handled by this multiprocessor system. In one embodiment, the primary processing element can execute two threads, while each of the specialized processing elements can process a single thread. The processor can therefore execute ten threads simultaneously. Other systems may use two or even three primary processing elements that can each execute two concurrent threads, but this still allows a maximum of only six threads, in comparison to the ten threads of the Cell-type processor.

One embodiment of the multiprocessor system illustrated in FIGS. 3 and 4 is configured as a SIMD, bi-endian system. In other words, the system can operate on multiple pieces of data (e.g., by adding, shifting or performing other operations on an arrays of data words in multiple-word registers), and can also function cooperatively with devices that are both big-endian and little-endian.

"Endian-ness" refers to the ordering of bytes of data or instructions in a computer system. The bytes of a data word may be stored beginning with the most significant byte, or they may be stored beginning with the least significant byte. Conventionally, a big-endian system stores the most significant byte at the lowest address for the byte or word, while a little-endian system stores the least significant byte at the lowest address. It is important in designing a computer system to understand this difference and to be able to convert data, if necessary, between big-endian and little-endian representations.

While the endian-ness of data is well understood and typically handled without unusual difficulty by system designers and programmers, there are some issues related to endian-ness that are less common, but must nevertheless be addressed in order to prevent misinterpretation of data. One such issue involves the use of preferred slots in multiple-byte or multiple-word lines of data.

One embodiment of the system illustrated in FIG. 4 utilizes 128-bit lines of data. Each line of data comprises 16 bytes, or four 32-bit words. Each line may therefore be referred to as a "quadword". This is a convenient data size because this particular embodiment is configured to process data and instructions as a SIMD processor. The SIMD processor receives a 128-bit line of data and can interpret this data as four separate pieces of information. In order to properly interpret the line of data, the processor must know whether the bytes in the line represent data, control information, or both. This is accomplished by using a "preferred slot".

A preferred slot is a predetermined slot, or location, within the data line. The processor interprets the data that falls within the preferred slot as scalar data—data that is applied to, or relates to, all data in a 128-bit register. The scalar data may be, for example, a load/store address, a shift amount, a result derived from the other data, etc. The data that does not fall in the preferred slot may be ignored.

For instance, when the shift-word instruction $RT(i)=RA(i)<<RB(0)$ is executed, a scalar shift value is read from the preferred slot in register B, and each word in register A is shifted by the number of bits specified by the scalar shift value. The shifted words are then stored in a target register (RT).

The preferred slot changes with the endian-ness of the system configuration. Typically, the location of the preferred slot in a big-endian system is in the most significant word, while the location of the preferred slot in a little-endian system is in the least significant word.

Figure 5:
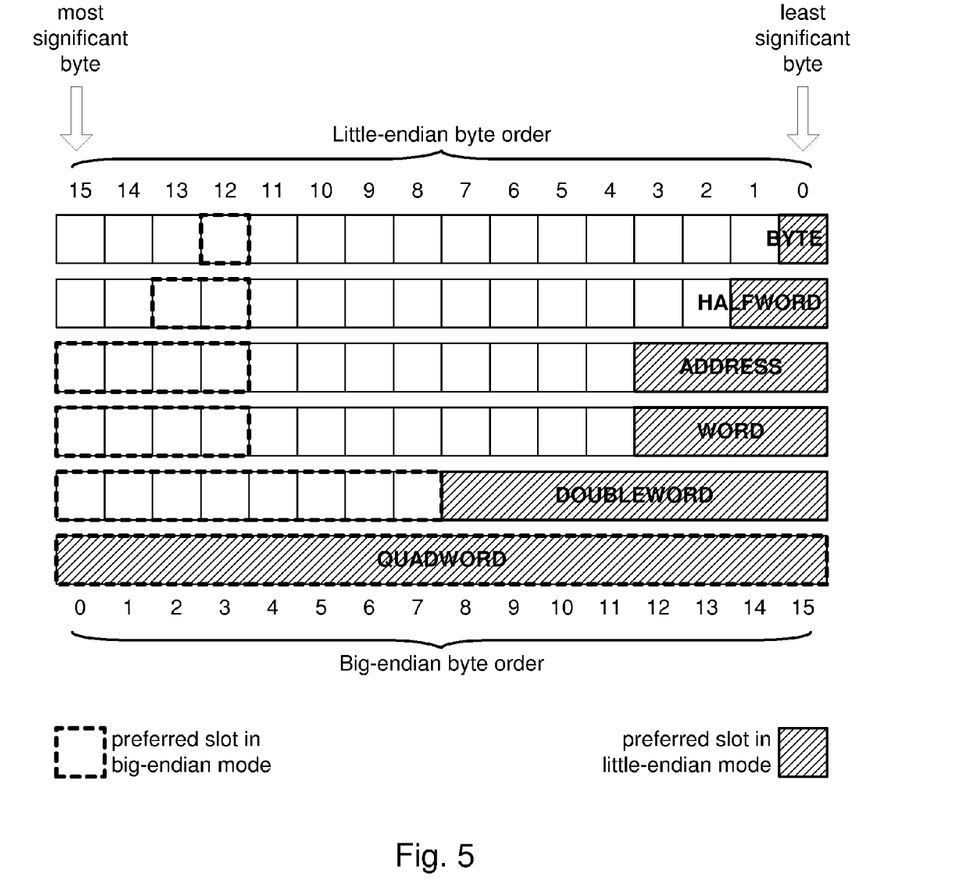
FIG. 5 is a diagram illustrating the locations of preferred slots in a 16-byte data line in accordance with one embodiment.

Referring to FIG. 5, a diagram illustrating the locations of preferred slots in a 16-byte data line in a 128-bit register in one embodiment is shown. FIG. 5 depicts six lines of data. Each line of data is 16 bytes (128 bits) long, as indicated by the blocks in each line. Each line shows the preferred slot in which a piece of data (or address) is stored, depending upon its size. From top to bottom, the lines show the preferred slots for a byte, a halfword (two bytes), an address (four bytes), a word (four bytes), a doubleword (eight bytes), and a quadword (16 bytes).

As shown in FIG. 5, the most significant bit of each data line is on the left, while the least significant bit is on the right. Consequently, in a big-endian scheme, the bytes are ordered from left to right. This is indicated by the numerals at the bottom of the figure, which go from 0 on the left (the most significant byte) to 15 on the right (at least significant byte). Byte 0 is stored at the address of the data line, with each successive byte stored at the next data address. Thus, if the data line is stored at address xxx00, the most significant byte is stored at address xxx00, the next most significant byte is stored at xxx01, and so on. In a little-endian scheme, the bytes are ordered from right to left, and as indicated by the numerals at the top of the figure. When this scheme is used, the least significant byte is stored as a byte 0, and the most significant byte is stored as byte 15. As a result, if the data line is stored at address xxx00, the least significant byte is stored at address xxx00, the next least significant byte is stored at xxx01, and so on.

The preferred slots in the data lines are indicated in FIG. 5 by shading and dotted lines. The preferred slots for a little-endian scheme are shaded, while the preferred slots for a big-endian scheme are indicated by the dotted lines. In the little-endian scheme, the preferred slots are at the lower end (lower address) of the data line, where the least significant bytes are normally found. In this scheme, the preferred slot for a single byte is byte 0. The preferred slot for a half word (two bytes) is bytes 0:1. The preferred slot for an address (32 bits) or a full word (four bytes) is bytes 0:3. The preferred slot for a doubleword (eight bytes) is bytes 0:7. Finally, the preferred slot for a quadword (16 bytes) consists of the entire data line (bytes 0:15).

In a big-endian scheme, the preferred slots begin with the more significant bytes, though not necessarily the most significant bytes, of the data line. It should be noted that the more significant bytes are at the lower addresses in the big-endian scheme, rather than at the higher addresses as in the little-endian scheme. In the big-endian scheme, the preferred slot for a single byte is byte 3. The preferred slot for a half word (two bytes) is bytes 2:3. The preferred slot for an address (32 bits) or a full word (four bytes) is bytes 0:3. The preferred slot for a doubleword (eight bytes) is bytes 0:7. While the preferred slots for the address, word and doubleword all occupy the same byte numbers as in the little-endian scheme, these bytes are located at the more significant end of the data line rather than the less significant end as in the little-endian scheme. The preferred slot for a quadword (16 bytes) consists of the entire data line (bytes 0:15), so there is no difference from the little-endian scheme.

As noted above, the preferred slots in the little-endian scheme all start at the base address of the data line (i.e., they all begin with byte 0), but the preferred slots in the big-endian scheme do not. The preferred slots in the big-endian scheme may begin with bytes 0, 2 or 3, depending upon the size of the preferred slot. It can be seen that, for the preferred slots which fit within a single 32-bit word, the slots are in the same position with respect to the least significant bytes within the word. That is, each of the preferred slots begins with the least significant byte of the word. The words in which the preferred slots are located, however, are transposed from one scheme to the other—while these preferred slots are located in the least significant word in the little-endian scheme, they are in the most significant word in the big-endian scheme. It can also be seen that the doubleword preferred slot is transposed from the least significant double word in the little-endian scheme to the most significant double word in the big-endian scheme.

Figure 6:
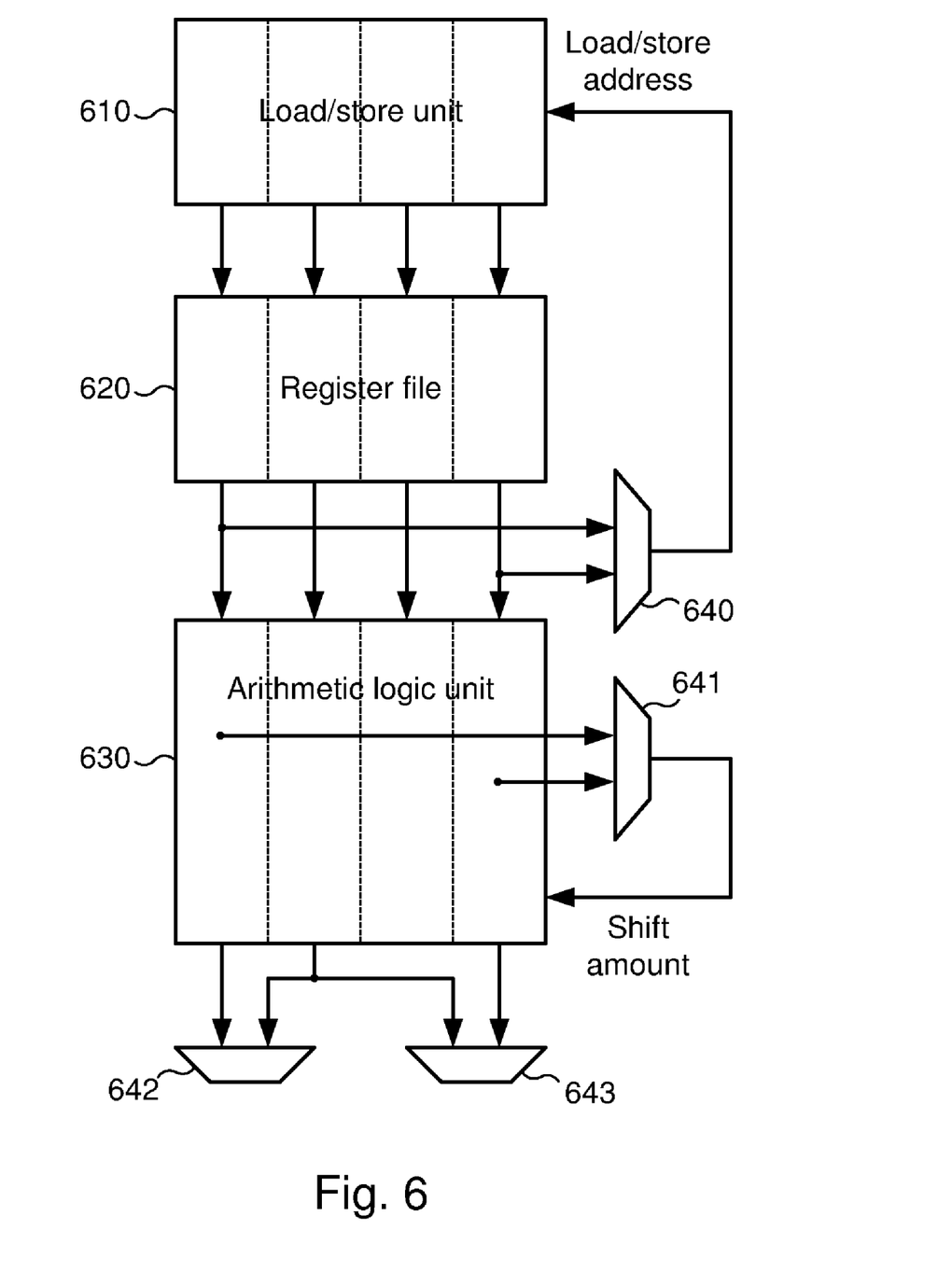
FIG. 6 is a functional block diagram illustrating the structure of a processor core within a bi-endian multiprocessor system in accordance with the prior art.

Because the positions of the preferred slots may change in a bi-endian system depending upon whether a big-endian or a little-endian scheme is used, it is necessary to provide some means to handle data so that the preferred slot is properly recognized are interpreted, and so that data which is destined for the preferred slot is stored in the proper location. Referring to FIG. 6, a functional block diagram illustrating the structure of a processor core within a bi-endian multiprocessor system in accordance with the prior art is shown. This processor core is designed to use several multiplexers to read data from or store data to either a position associated with a big-endian preferred slot, or a position associated with a little-endian preferred slot.

The processor core of FIG. 6 includes a load/store unit 610, a register file 620 and an arithmetic logic unit 630. These components of the processor core perform the desired operations on the data that is processed by the processor core. Multiplexers 640-643 are used to select the appropriate preferred slot positions based upon the mode (big-endian or little-endian) in which the processor core is operating.

It can be seen that load/store unit 610, register file 620 and arithmetic logic unit 630 each include a set of dotted lines which divide the respective components into four portions. These dotted lines do not represent a physical subdivision of the components, but are instead used to show that each component can process one line of data containing four 32-bit words concurrently. Load/store unit 610 retrieves a line of data from memory (e.g., a local memory) and provides this data to register file 620. Register file 620 temporarily stores the data so that it can be accessed by arithmetic logic unit 630. Data which is processed (or generated) by arithmetic logic unit 630 may then be output or stored in register file 620, from which load/store unit 610 may store the data in the local memory associated with the processor core.

As noted above, the preferred slot in the line of data may be in either the first word or the last word of the line, depending upon whether the processor core is operating in a big-endian mode or a little-endian mode. The processor core must therefore be able to properly handle the data that is in the preferred slots. This is accomplished by including several multiplexers in the design. More specifically, these multiplexers must be included wherever a preferred slot is used. The multiplexers select between the big-endian preferred slot position and the little-endian preferred slot position. As illustrated in FIG. 6, multiplexer 640 is used to select line of the preferred slot positions in register file 620 so that the preferred slot data can be provided to load/store unit 610. Multiplexer 641 is used to select the proper preferred slot position in arithmetic logic unit 630 so that the appropriate data can be used to shift amount values within the arithmetic logic unit. Multiplexers 642 and 643 are used to select the proper preferred slot positions with respect to the output of arithmetic logic unit 630.

While the multiplexers used in conventional bi-endian systems serve the desired purpose, there are some drawbacks to this solution. For instance, because it takes time for the selected data to propagate through the multiplexers and to be provided to the appropriate logic circuits, the multiplexers increase the delay in the affected data paths. Because the multiplexers are typically within critical paths that define the cycle time for the system, the increased delays may reduce the maximum operating frequency of the system. Still further, the additional circuitry of the multiplexers and corresponding interconnects requires additional area on the integrated circuit die, which increases the expense of manufacturing the system.

The various embodiments of the present invention may reduce or eliminate these shortcomings by eliminating the need for the multiplexers that are used to select the appropriate preferred slot position. This is accomplished by swapping, if necessary, the positions of the words within each data line when the data line is transferred between the main memory and the local memory of an individual processing element. In one embodiment, the processing element is configured to operate on data using a little-endian representation. When the processing element operates in conjunction with a device that also uses a little-endian data representation, data is transferred from the main memory to the local memory without any changes to the data. When the processing element operates in conjunction with a device that uses a big-endian data representation, the words of each data line transferred to the local memory are transposed, thereby moving the preferred slot data from the big-endian preferred slot position to the little-endian preferred slot position. When data is transferred from the local memory back to the main memory, the words of each data line are again transposed, so that the preferred slot data is moved from the little-endian preferred slot position to the big-endian preferred slot position.

Figure 7:
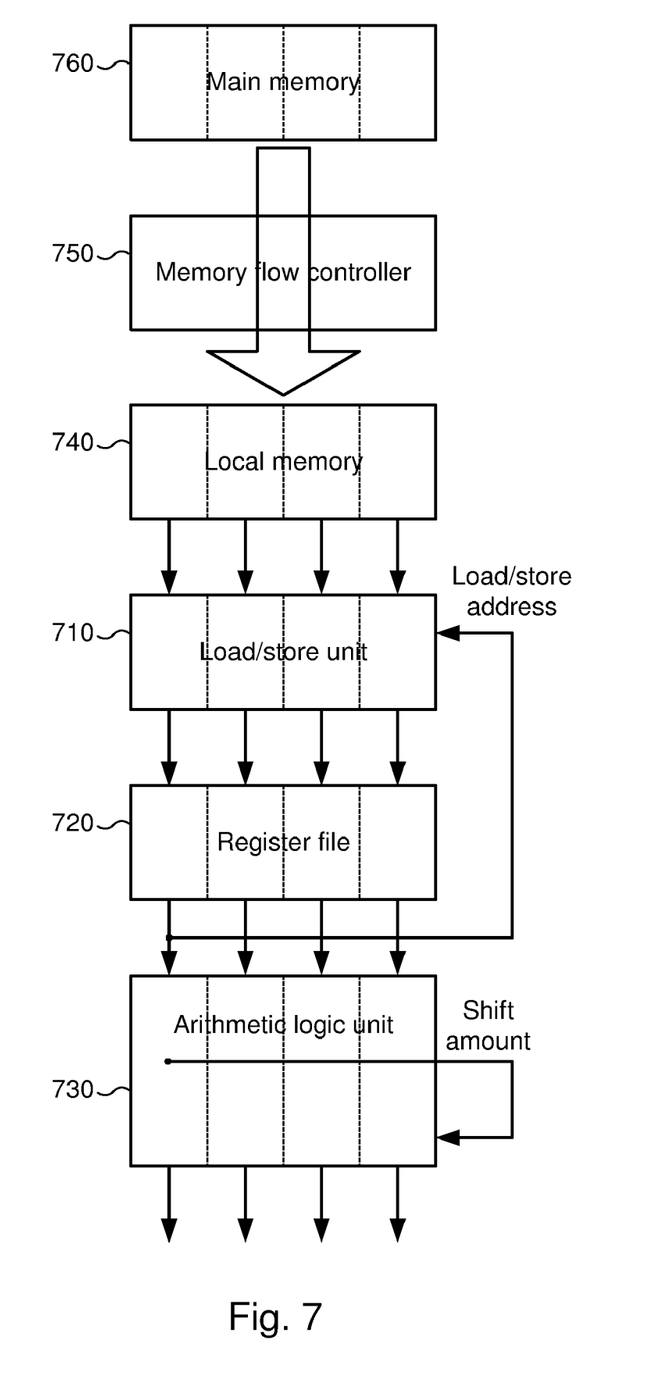
FIG. 7 is a functional block diagram illustrating the structure of a processing element in accordance with one embodiment.

Referring to FIG. 7, a functional block diagram illustrating the structure of a processing element in accordance with one embodiment of the invention is shown. This figure depicts a processor core such as the ones illustrated in FIGS. 3 and 4, as well as the local memory and a memory flow controller that transfers data between the local memory and a main memory.

The structure of the processor core in FIG. 7 is similar to the structure of the prior art processor core of FIG. 6, in that it includes a load/store unit 710, a register file 720 and an arithmetic logic unit 730. The processor core of FIG. 7, however, does not incorporate multiplexers for the purpose of selecting different preferred slot positions. Whenever a preferred slot is used, the preferred slot is always in the same position (i.e., the preferred slot is in the first, or left-most, word of the data line). The data in the preferred slot can therefore be provided directly to various logic circuits (e.g., provided to load/store unit 710 or used to shift the data within arithmetic logic unit 730) without having to propagate through any multiplexers. This avoids the additional delays, potential frequency reductions, and additional circuitry and expense of the prior art system.

Figure 8:
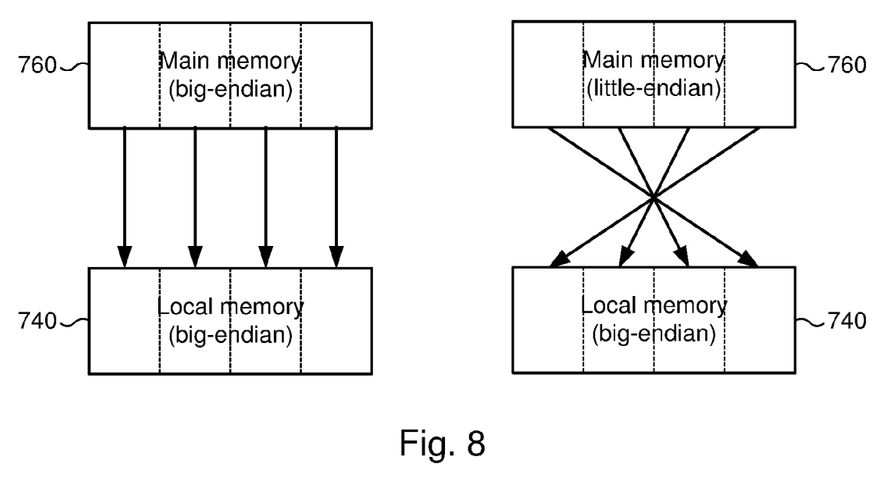
FIG. 8 includes a pair of diagrams illustrating the modes of operation of a memory flow controller in accordance with one embodiment.

Referring to FIG. 8, a pair of diagrams illustrating the modes of operation of the memory flow controller are illustrated. The diagram on the left side of the figure illustrates the simple transfer of data between main memory 760 and local memory 740 in a first mode of operation. This mode is used when the endian-ness of the main memory is the same as the endian-ness of the local memory and processor core. In the figure, both main memory and local memory are shown as using a big-endian representation of data, but the data transfer operation remains the same if both use a little-endian representation. When the memory flow controller is operating in this first mode, the data word (bits 96:127) which occupies the first word-position in the data line in the main memory also occupies the first word position in the data line when it is stored in the local memory. Likewise, the data words in the second, third and fourth positions in the main memory also occupy the second, third and fourth positions, respectively, in the local memory.

The diagram on the right side of the figure illustrates the transposition of data words when data lines are transferred between main memory 760 and local memory 740 in a second mode of operation. This mode is used when the endian-ness of the main memory is different from the endian-ness of the local memory and processor core. In this diagram, the main memory is shown as using a little-endian data representation, while the local memory is shown as using a big-endian data representation. Alternatively, the main memory could use a big-endian representation while the local memory uses a little-endian representation. When the memory flow controller is operating in this second mode, the data words of each data line are transposed as they are transferred between the main memory and the local memory. In other words, the first data word in the line stored in the main memory is stored in the local memory as the last data word in the line. Similarly, the second, third and fourth data words in the main memory are stored as the third, second and first words, respectively, in the local memory.

It should be noted that, while the memory flow controller transposes (when necessary) the words in the data lines, the bits within the words (or doublewords, or quadwords) are not transposed. The potential need for transposition of bits is known in the art and can be implemented as needed by programmers or system designers using conventional techniques. It should also be noted that transposition of the bits in a 128-bit line, 64-bit doubleword or 32-bit word does not necessarily result in the same preferred slot positions as the transposition of words described herein.

As noted above, the processing elements may incorporate their own cache memories (the SL1 caches) to allow the processing elements access to a wider memory space than is available in their respective local memories. The SL1 caches may be configured to function in a manner similar to that of the memory flow controllers, so that data accesses to the main memory (or other levels of cache memories) involve either straight transfers or transpositions of data words, depending upon the selected mode of operation.

In the description above, data is transferred either to or from the main memory. It should be noted that the processing elements may be able to access data in or through components other than the main memory. For instance, the virtual address space accessible to a processing element may include its local memory, the main memory, video memory, input/output devices (memory mapped I/O), and so on. In an alternative embodiment of the invention, the processing element can selectively access these data sources using the first and second modes described above. A single selected mode can be applied to all of the data sources, or the mode can be selected independently for each of the data sources, depending upon the endian-ness of the respective data sources.

In one embodiment, the system is configured to select the appropriate operating mode at startup. This selection may be made in response to detecting that data source to be accessed (e.g., the main memory) has a particular endian-ness, or the selection may be made manually.

While the transposition of words within a data line as described above does not affect operations on individual 32-bit words, such as 32-bit adds, it may affect other operations. For example, a doubleword add is affected, because the two halves of each doubleword are reversed. Normally, a carry bit from the least significant word is added to the most significant word in the doubleword. If the words within the doublewords are reversed, however, the carry bit is carried from the most significant word to the least significant word, resulting in an error. It is therefore necessary to incorporate modifications to the logic of the processor core to account for the potential reversal of the halves of the doublewords.

Figure 9:
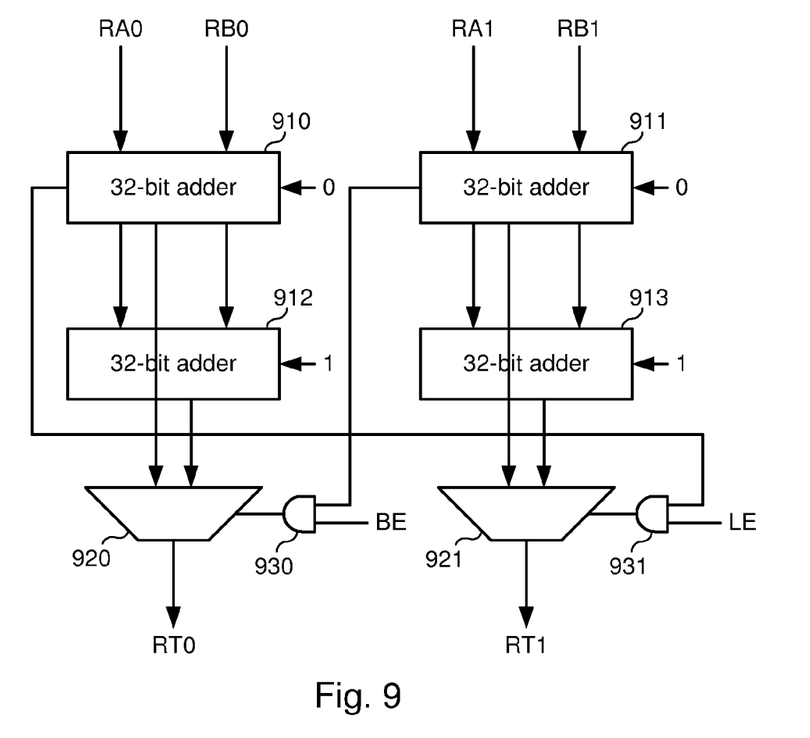
FIG. 9 is a functional block diagram of a logic circuit configured to properly carry a bit from the least significant word of a doubleword to the most significant word in accordance with one embodiment.

Referring to FIG. 9, a functional block diagram of a logic circuit configured to properly carry a bit from the least significant word to the most significant word in the doubleword is shown. Conventionally, the least significant words of two doublewords are added, and a carry bit from the least significant words is added, if necessary, to the most significant words of the two doublewords. Because the positions of the least significant and most significant words within each doubleword are dependent upon whether the data words have been transposed, it is necessary to provide a mechanism to add the carry bit to the appropriate halves of the doublewords. An exemplary mechanism is illustrated in FIG. 9.

FIG. 9 shows four 32-bit adders (910-913). Each of adders 910 and 912 receives 32-bit words from registers RA0 and RB0. These registers store the first halves of the doublewords that are being added. The first halves of the doublewords may be either the least significant or most significant words, depending upon whether the words within the data lines have been transposed. Each of adders 911 and 913 receives 32-bit words from registers RA1 and RB1, which store the second halves of the doublewords that are being added. If registers RA0 and RB0 store the least significant words of the doublewords, registers RA1 and RB1 store the most significant words of the doublewords, and vice-versa.

While adders 910 and 912 both receive and add the same two 32-bit words, adder 912 also adds an extra bit that represents a carry bit. Adder 910 does not add this extra bit to the values in registers RA0 and RB0. Similarly, adders 911 and 913 both receive and add the same 32-bit words (from registers RA1 and RB1), but adder 913 also adds an extra bit, while adder 911 does not. Each of the pairs of adders (910/912 and 911/913) provides its output to a corresponding multiplexer which selects the appropriate one of the adders' outputs based upon the mode in which the system is operating.

The sums computed by adders 910 and 912 are provided as inputs to multiplexer 920. The sums computed by adders 911 and 913 are provided as inputs to multiplexer 921. Multiplexer 920 receives a control input from AND gate 930, while multiplexer 921 receives its control input from AND gate 931. AND gate 930 receives as inputs a carry bit from adder 911 and a control signal (BE) that is asserted (high) when the main memory and local memory have same endian-ness. For example, when the main memory or other data source uses a big-endian data representation and the processor core uses a big-endian data representation. AND gate 931 receives as inputs a carry bit from adder 910 and a control signal (LE) that is asserted (high) when the main memory and local memory have different endian-ness. For example, when the main memory or other data source uses a little-endian data representation, and the processor core uses a big-endian data representation.

In operation, only one of the BE and LE control signals will be asserted (high in this embodiment). The other of these control signals will be de-asserted (low in this embodiment). If the LE signal is asserted, this indicates that the data source uses a little-endian data representation (while the processor core uses big-endian data representation). In this case, registers RA0 and RB0 will contain the least significant words of the doublewords that are being added, and registers RA1 and RB1 will contain the most significant words. Consequently, no carry bit should be added to the values in registers RA0 and RB0, but a carry bit should be added to the values in registers RA1 and RB1 if one is generated by the addition of the least significant word values in adder 910. Since the LE control signal is high, the carry bit is simply passed through AND gate 931. If the carry bit is 0, this input to multiplexer 921 will cause the multiplexer to select adder 911, which produces the sum of the most significant words without an extra bit. If the carry bit is 1, this input to multiplexer 921 will cause the multiplexer to select adder 913, which produces the sum of the most significant words with an extra bit. Because control signal BE is low, any carry bit generated by adder 911 is blocked by AND gate 930, so the output of the AND gate is 0 and the output of adder 910 is selected.

The BE control signal is asserted when the data source uses a big-endian data representation and the processor core uses a big-endian data representation. In this case, registers RA0 and RB0 will contain the most significant words of the doublewords that are being added, and registers RA1 and RB1 will contain the least significant words. Consequently, a carry bit generated by the addition of the values in registers RA1 and RB1 should be carried to the addition of the values in registers RA0 and RB0, but no carry bit should be added to the values in registers RA1 and RB1. Since control signal BE is high, a carry bit generated by adder 911 will be passed through AND gate 930 to multiplexer 920. If the carry bit is 0, multiplexer 920 will select the output of adder 910, which does not add an extra bit to the values in registers RA0 and RB0. If, on the other hand, the carry bit is 1, multiplexer 920 will select the output of adder 912, which does add an extra bit to the words in registers RA0 and RB0. Because control signal LE is low, any carry bit generated by adder 910 is blocked by AND gate 931, so the output of the AND gate is 0 and the output of adder 911 is selected.

As pointed out above, the doubleword adder of FIG. 9 assumes that the processor core in which the adder is implemented uses a big-endian data representation. In alternative embodiments, the processor core may be configured to use a little-endian data representation, in which case the doubleword adder may be modified to account for this difference. It should also be noted that the logic circuitry of FIG. 9 may be implemented in alternative embodiments using different components and those shown in the figure. For instance, the doubleword adder could be implemented using only two 32-bit adders, with the carry bit from each adder being AND'ed with the appropriate one of the LE and BE control signals, and the result being added to the values summed in the other adder. It is contemplated, however, that such an implementation would not allow the processor core to operate at as high a speed as the implementation illustrated in FIG. 9.

While the disclosure of the present application discusses the invention in the context of multi-processor computing systems, it should be noted that the invention is more widely applicable and can be used in a variety of other contexts. Consequently, the disclosure should not be considered as limiting the invention to the field of multimedia game systems.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

What is claimed is:

1. A device comprising:
 a memory flow controller having a direct memory access (DMA) engine;
 wherein the DMA engine is configured to transfer data between a local memory dedicated to a processing element and a data source external to the processing element;
 wherein the DMA engine is configured to transfer multiple-word lines of data; and
 wherein the DMA engine is configured to operate alternately in either a first mode or a second mode, wherein in the first mode, the DMA engine transfers each line of data without transposing the words in each line of data, and wherein in the second mode, the DMA engine transposes the words in each line of data when the DMA engine transfers the line of data;
 wherein the device further comprises a processing element configured to receive lines of data transferred by the DMA engine to the local memory, wherein the processing element includes logic circuitry configured to add doublewords in the lines of data, wherein the logic circuitry is configured to carry bits from the first words of the doublewords to the second words of the doublewords in response to determining that the data source implements a little-endian data representation, and wherein the logic circuitry is configured to carry bits from the second words of the doublewords to the first words of the doublewords in response to determining that the data source implements a big-endian data representation.

2. The device of claim 1, wherein the DMA engine is configured to operate in the first mode when the local memory and the data source have the same endian-ness and wherein the DMA engine is configured to operate in the second mode when the local memory and the data source have different endian-ness.

3. The device of claim 2, wherein the local memory implements a little-endian data representation and the data source implements a big-endian data representation.

4. The device of claim 2, wherein the local memory implements a big-endian data representation and the data source implements a little-endian data representation.

5. The device of claim 1, wherein each line of data comprises 128 bits and each word comprises 32 bits.

6. The device of claim 1, wherein the DMA engine is configured to transfer each line of data without transposing a bit-order of each word within each line of data.

7. The device of claim 1, further comprising a processing element configured to receive lines of data transferred by the DMA engine to the local memory, wherein the processing element is configured to utilize data within preferred slots in one or more of the lines of data as scalar data which is used to process data of other operands in the respective lines of data, and wherein the locations of the preferred slots are determined without regard to whether the local memory and the data source implement data representations that have the same endian-ness or different endian-ness.

8. A system comprising:
 a plurality of processing elements, wherein each processing element includes a processor core, a local memory dedicated for use by the processor core, and a memory flow controller configured to transfer data; and
 one or more data sources external to the processing elements;
 wherein for each processing element, the memory flow controller is configured to transfer multiple-word lines of data between the processing element and the one or more data sources, wherein the memory flow controller is configured to operate alternately in either a first mode or a second mode, wherein in the first mode, the memory flow controller transfers each line of data without transposing the words in each line of data, and wherein in the second mode, the memory flow controller transposes the words in each line of data when the memory flow controller transfers the line of data; and
 wherein each processing element includes logic circuitry configured to add doublewords in the lines of data, wherein the logic circuitry is configured to carry bits from the first words of the doublewords to the second words of the doublewords in response to determining that the data source implements a little-endian data representation, and wherein the logic circuitry is configured to carry bits from the second words of the doublewords to the first words of the doublewords in response to determining that the data source implements a big-endian data representation.

9. The system of claim 8, wherein each of the processing elements further comprises a local cache memory coupled between the processor core and a main memory external to the processing elements.

10. The system of claim 8, wherein the memory flow controller is configured to operate in the first mode when the local memory and the data source have the same endian-ness and wherein the DMA engine is configured to operate in the second mode when the local memory and the data source have different endian-ness.

11. The system of claim 10, wherein the local memory implements a little-endian data representation and the one or more data sources implement a big-endian data representation.

12. The system of claim 10, wherein the local memory implements a big-endian data representation and the one or more data sources implement a little-endian data representation.

13. The system of claim 8, wherein each line of data comprises 128 bits and each word comprises 32 bits.

14. The system of claim 8, wherein the memory flow controller is configured to transfer each line of data without transposing a bit-order of each word within each line of data.

15. A method for maintaining preferred slot positions in data lines that are transferred between a processing element and a data source external to the processing element, the method comprising:

determining whether the processing element and the data source use big-endian or little-endian data representations;

selecting either a first mode of operation or a second mode of operation, wherein the first mode of operation is selected in response to determining that the processing element and the data source use the same data representation, and wherein the second mode of operation is selected in response to determining that the processing element and the data source use different data representations;

transferring lines of data between the processing element and the data source, wherein each data line includes multiple data words, wherein each line of data is transferred without transposing the words therein in response to selection of the first mode of operation, and wherein the words in each line of data are transposed when the line of data is transferred in response to selection of the second mode of operation, and reading scalar data from and writing scalar data to preferred slots in one or more of the lines of data, wherein the locations of the preferred slots are determined without regard to whether the processing element and the data source implement data representations that have the same endian-ness or different endian-ness.

16. The method of claim 15, wherein the processing element implements a little-endian data representation and the data source implements a big-endian data representation.

17. The method of claim 15, wherein the processing element implements a big-endian data representation and the data source implements a little-endian data representation.

18. The method of claim 15, wherein each line of data comprises 128 bits and each word comprises 32 bits.

19. The method of claim 15, wherein transferring lines of data between the processing element and the data source is performed without transposing a bit-order of each word within each line of data.

* * * * *